United States Patent [19]

Kosugi et al.

[11] 3,876,301

[45] Apr. 8, 1975

[54] POSITIONING DEVICE PROVIDED WITH A FOLLOW-UP OPERATING MECHANISM

[75] Inventors: Masao Kosugi, Kawasaki; Masaru Higuchi, Tokyo, both of Japan

[73] Assignee: Canon Kabushiki Kaisha, Tokyo, Japan

[22] Filed: Jan. 15, 1973

[21] Appl. No.: 323,375

[30] Foreign Application Priority Data

Jan. 19, 1972 Japan .................................. 47-7497

[52] U.S. Cl. ..................... 355/53; 33/1 M; 33/1 PT; 355/14

[51] Int. Cl. ............................................ G03b 27/58

[58] Field of Search ............. 355/53, 43, 74, 76, 75, 355/18; 95/12; 33/1 M, 1 N, 1 PT; 73/88, 55 D

[56] References Cited

UNITED STATES PATENTS

| | | | |
|---|---|---|---|
| 3,188,860 | 6/1965 | Roberts | 33/1 PT X |
| 3,334,541 | 8/1967 | Delp | 95/12 X |
| 3,455,026 | 7/1969 | Brault | 33/1 M |
| 3,524,394 | 8/1970 | Sumners | 355/53 UX |
| 3,566,763 | 3/1971 | Knopf | 355/53 X |
| 3,591,924 | 7/1971 | Berg | 33/1 M |
| 3,662,312 | 5/1972 | Thorp et al. | 73/88.5 SD |
| 3,722,996 | 3/1973 | Fox | 355/76 X |

*Primary Examiner*—Samuel S. Matthews
*Assistant Examiner*—E. M. O'Connor
*Attorney, Agent, or Firm*—Flynn & Frishauf

[57] ABSTRACT

A positioning table monitored by an optical system for viewing registry of a photoprinting pattern and an article to be positioned is movable in the horizontal plane in two directions mutually at right angles and in rotation about a central point by means of three drives. A manually operable control for the drive provides for linear and rotary displacement of a grip knob and resolution of the combined displacement into linear and rotary factors by deflection of resilient members, to which strain gauges are affixed. The strain gauge outputs are provided in directional pairs respectively to which circuits from which signals are taken, amplified and supplied to the positioning drive. The drive speed depends upon the amount of displacement of the manual grip knob. When the grip knob is not actuated, it restores to a reference position.

12 Claims, 8 Drawing Figures

POSITIONING DEVICE PROVIDED WITH A FOLLOW-UP OPERATING MECHANISM

BACKGROUND OF THE INVENTION

1. Field of the Invention

This invention relates to a positioning device provided with a follow-up operating mechanism, and more particularly relates to a positioning device for setting an article in a predetermined position, the device having a hand-operated operating mechanism for positioning movable supporting means that support an article.

2. Description of the Prior Art

In the bonding process for assembling transistors or IC (integrated circuit) semiconductor elements or in the pattern printing process for these elements, it is essential to accurately place the semiconductor pellets or wafer patterns in a predetermined position. However, placing minute articles such as semiconductors or the like in a predetermined position with high accuracy has been quite cumbersome even to skilled operators, thus requiring them to acquire a very high degree of skill and long-time practical experience.

In order to position a semiconductor wafer or other minute article with very high accuracy, it has most often been the practice to use a microscope, place the article to be positioned within the view field of the microscope and displace the article to a predetermined position while viewing it through the microscope. The manufacture of IC elements, particularly the process of printing a predetermined pattern on a semiconductor wafer substrate of an IC, offers a typical example. To position a semiconductor wafer coated with a photoresist layer with respect to a mask provided with a pattern to be printed, an operator places the wafer on a wafer support table and within the view field of a microscope, manually operates adjusting dials to displace the support table until a referential mark formed on the wafer is registered with a reference mark formed on the mask, then displaces the microscope away from the semiconductor wafer and moves a printing light source into alignment with the wafer, and finally turns on the light source to print the predetermined pattern on the mask onto the photoresist layer of the semiconductor wafer. Such a process has required the operator measure movement and alignment by eye during the positioning operation for each semiconductor wafer, and the required time and skill has become a serious bottleneck in the positioning operation.

Recently, an alignment mechanism called the "Chessman" system has been proposed as an improvement of the above process, in which the operator is required to effect and operation for the positioning adjustment in two directions at right angle each other in the same plane. In this system, however, a table with a semiconductor wafer placed thereon and a manipulator adapted to manually operate the table from the outside are mechanically linked so that the relation with respect to the position between them is subject to a mechanical restriction and it is not possible to separate the manipulator from the table, which is a disadvantage.

SUMMARY OF THE INVENTION

The principal object of this invention is to eliminate all of the foregoing disadvantages existing in the prior art and to obtain an automatic operation of the foregoing alignment so that the efficiency of work may be improved.

Another object of this invention is to provide a positioning device, in which movable support means with an article placed thereon in a desired position, can be moved under manual control in a plane in two directions (X and Y) at right angles to each other and also rotated (O direction) and in which control signal producing means produce an output electric signal; dividing the amount of movement from a reference point into X, Y, and O components receives a control signal from manual operating means and supplies its output to driving means to cause the support means to follow the displacement of the operating means.

A further object of this invention is to provide a positioning device, in which manual control may be released, so that the operating means may automatically be returned to its reference position.

Other objects and features of the present invention will become fully apparent from the following detailed description taken in conjunction with the accompanying drawings.

DESCRIPTION OF THE PREFERRED EMBODIMENTS

First, the operation of alignment in a previously known mask pattern printing device will now be described with reference to FIG. 1.

Figure 1:
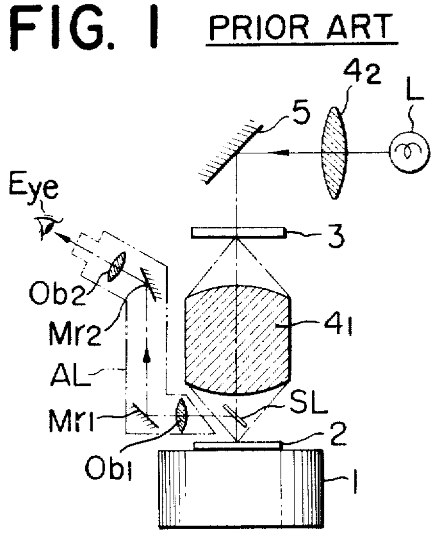
FIG. 1 PRIOR ART
FIG. 1 is a diagrammatic cross-section showing the principle of a mask pattern printing device heretofore used.

In FIG. 1, the reference numeral 1 designates a table, on which a wafer 2 is placed and which is movable in all directions by combination of movement in two directions, that is, X direction and Y direction, mutually at right angles in the same plane, and a direction in rotating movement, that is, O direction. A mask having a pattern to be printed on said wafer 2 is designated at 3. The numeral 5 designates a mirror, and L is a light source. The numeral $4_1$ designates a projection lens, magnification of which is preferably 1. The numeral $4_2$ designates a condensing lens. SL is a half mirror arranged between the projection lens $4_1$ and the wafer 2. The half SL functions to let a beam of light pass and to reflect a reflected ray from the upper surface of wafer 2. AL is an alignment scope which detects flux of light from the half mirror SL, consisting of elements such as an objecting lens $Ob_1$, mirrors $Mr_1$, $Mr_2$ and an eyepiece $Ob_2$.

The alignment operation is carried out in such a manner that a pattern image of mask 3 is irradiated and printed, towards the wafer 2 movably mounted in X, Y, and O directions on the table 1, by a projection optical system consisting of a light source L, a condensing lens $4_2$, a reflecting mirror 5, and a projection lens $4_1$, then the position of table 1 is adjusted while viewing the wafer surface through the alignment scope AL, and another mask pattern image is made in registration with the image previously printed on the wafer 2.

As for the mask pattern printing device, there is another device of a type different from the so-called projection system shown in FIG. 1, in which a mask pattern is printed by closely contacting the mask 3 with wafer 1 with or without a slight space between them, instead of interposing the projection lens $4_1$ between the mask 3 and the wafer 1. Of course, such a system must also have an alignment operation and an alignment scope as shown in FIG. 1 is therefore used.

Figure 2:
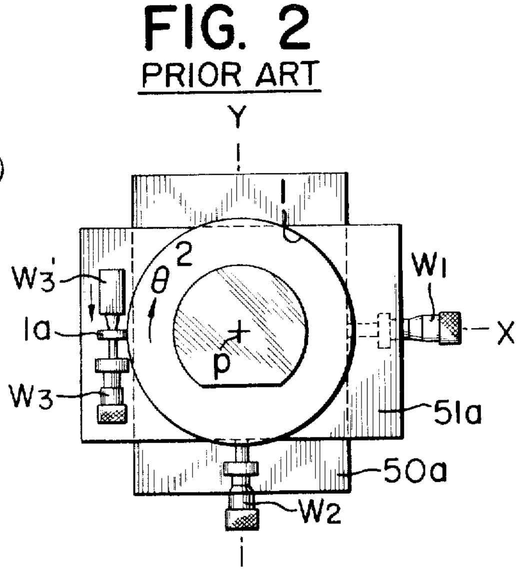
FIG. 2 PRIOR ART
FIG. 2 is a plan view of the wafer positioning device used in the mask pattern printing of FIG. 1.

A construction of table 1 used for positioning a wafer in the mask pattern printing device heretofore used is shown in FIG. 2. In this Figure, the numeral 2 designates a wafer placed on the table 1. The table 1 is displaceable in X, Y, and O directions in the same plane. 51a denotes a base board arranged to transport the table 1 in the X direction, 50a denotes a base board arranged to transport the table 1 for motion in the Y direction perpendicular to said X direction, the base boards being respectively provided with hand-operated position adjusting members $W_1$ (for movement in the X direction) and $W_2$ (for movement in the Y direction). $W_3$ is a position adjusting member adapted to press a projection piece 1a mounted on the table 1 so the table 1 can be rotated (in the O direction) on its axis *p*. $W_3'$ is an adjusting member resiliently urging the projection piece 1*a* in a direction (shown at arrow) reverse to the pressing direction of the adjusting member $W_3$. The resilient member $W_3$, returns the projection 1*a* to its original position when manual operation of the adjusting member 3 is released.

The table 1 can be moved in X, Y, and O directions in the same plane by respective operation of the adjusting members $W_1$, $W_2$, and $W_3$.

The disadvantages of prior art device shown in FIG. 1 and FIG. 2 have already been mentioned.

Figure 3:
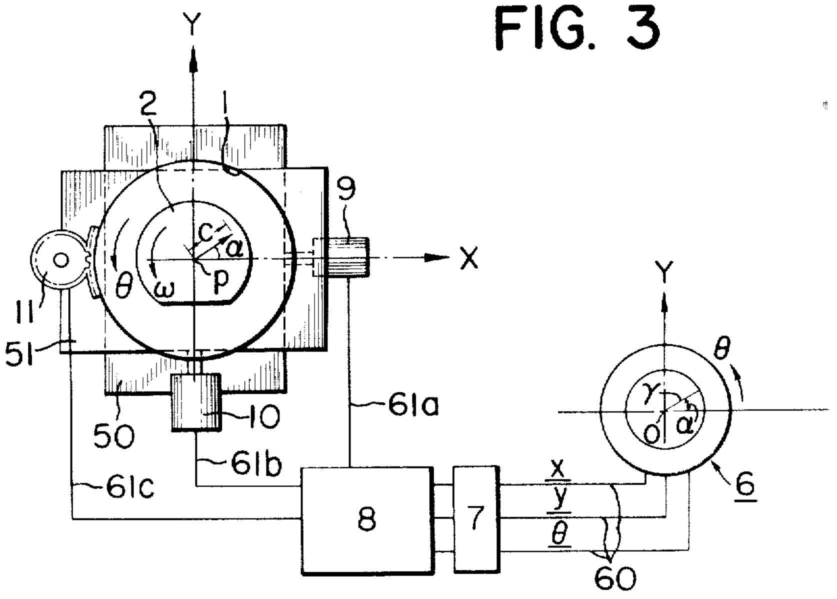
FIG. 3 is a plan view, partly schematic showing the connecting relation of hand-operated means, control means, driving means, and article support means in a positioning device according to the present invention.

FIG. 3 illustrates a general view of one mode of embodiment the present invention. In this Figure, 6 denotes hand-operated means, detailed construction of which will hereinafter be described. This operating means can be moved in X, Y, and O directions in the same plane, as indicated by arrow. The numeral 7 denotes a bridge circuit hereinafter described, 8 denotes a amplification circuit which serves to amplify the output in said bridge circuit, both these circuits together constituting control means. The numeral 60 represents wires for transmitting an output signal from control signal producing means (hereinafter described) added to the operating means 6, to the bridge circuit in the form of electric signals *x*, *y*, and $\theta$ corresponding to displacement information in X, Y, and O directions. Numerals 1 and 2 designate the aforesaid table and wafer, respectively. Numerals 9, 10, and 11 denote servo-motors, which are connected through lead wires 61a, 61b, and 61c, respectively, to the amplification circuit 8. The servo-motor 9 is operatively connected with a base board 50 in order to move the table 1 in the X direction in response of the operating means 6. The servo-motor 10 is operatively connected with a base board 51 in order to move the table 1 in the same direction as the Y direction of said operating means 6. The servo-motor 11 is operatively connected with the table 1 in order to move the table 1 in the O direction in response to the operating means 6. Such servo-motors 9, 10, and 11 serve as driving means for the table 1, each being individually operable.

The mode of embodiment of the operating means 6 will now be described referring to FIG. 4. The numerals 12, 13, 14 and 15 denote flat springs. The flat springs 12 and 14 are arranged to be positioned in symmetry with respect to X axis in the plane including X and Y axes as shown, while the flat springs 13 and 15 are arranged to be positioned in symmetry with respect to Z axis in the plane including Y and Z axes as shown. A fixing base, which fixes one ends of the flat springs 12 to 15, is shown at 16. Secured on the free upper end of each flat spring is a cylindrical sliding member 17. A housing 19 is fitted in an outer peripheral portion of the fixing base 16. An opening t is formed between 19 and 20 so that an operating grip 20 slides on its flange surface $20_1$ and flange surface $19_1$ of the housing 19 and is movable in a suitable direction in the same plane with these flange surfaces served as guide. Recesses 21 and 22, which extend in the direction of X axis and in the direction of Y axis, respectively, are formed in the back of the grip 20, and the sliding members 17 secured to the extremities of the flat springs are each slidably fitted in respective recesses.

Figure 4:
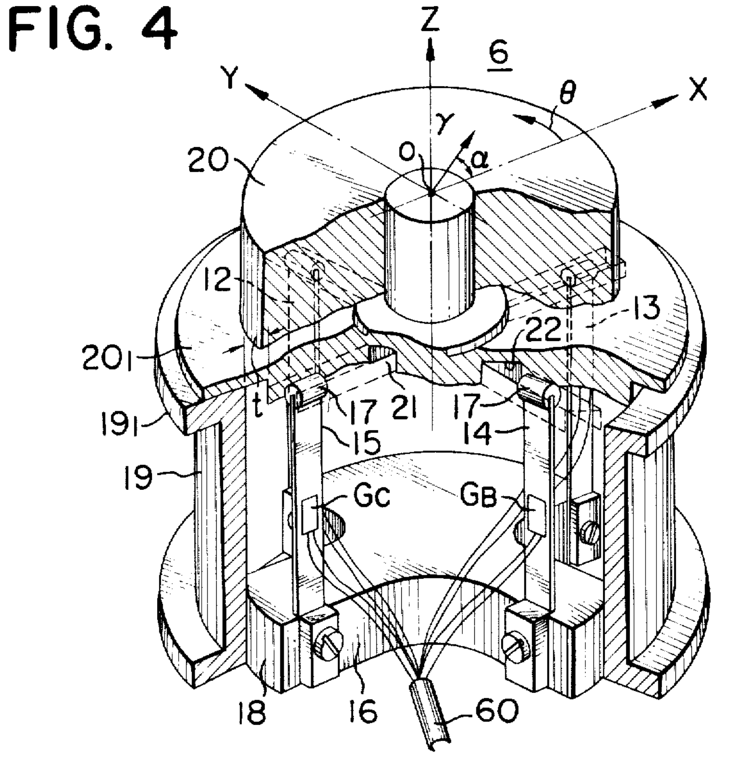
FIG. 4 is a perspective view, partly cut away in section showing details of the hand-operated means of the positioning device shown in FIG. 3 and of the associated control signal producing means.
Figures 5, 6:
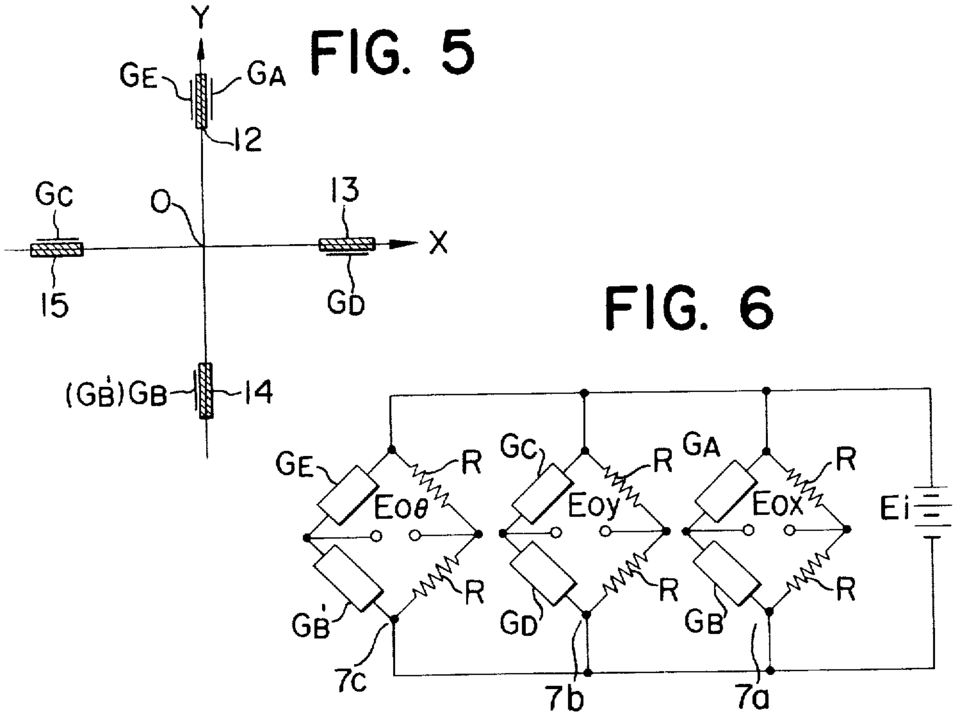
FIG. 5 is a plan showing an arrangement of a strain gauge used in the control signal producing means shown in FIG. 4.
FIG. 6 is an electric circuit diagram showing the connections for the strain gage shown in FIG. 4 and FIG. 5.

In order to easily understand these flat springs, the arrangement thereof is shown in FIG. 5 in horizontal cross-section, together with X and Y axes. In FIGS. 4 and 5, strain gauges attached on the sides of the flat springs 12 to 15 are designated at $G_A$, $G_B$, $G_C$, $G_D$, and $G_E$, which preferably are semiconductor strain gauges. In the illustrated case the strain gauges $G_A$, $G_B$ are attached to flat springs 12 and 14, respectively, to act as gauges for detecting displacement in X direction, the strain gauges $G_C$, $G_D$ are attached to flat springs 13 and 15, respectively, to act as gauges for detecting displacement in Y direction, and the strain gauge $G_E$ is attached to the side opposite to said strain gauge $G_A$ for said flat spring 12 to act as a gauge for detecting displacement in O direction in cooperation with the strain gague $G_B$. Instead of using the gauge $G_B$ in combination, gauge $G_B'$ may as well be attached to the flat spring 14 to act as a gauge for detecting displacement in O direction, an example of this kind being shown in FIG. 6 hereinafter described. As shown in FIG. 6, these strain gauges are connected through lead wire 60 with the bridge circuits.

The construction of the bridge circuits will now be described referring to FIG. 6. Ei is a power source. Three sets of bridge circuits 7*a*, 7*b*, and 7*c* are connected with said source Ei. These bridge circuits are provided for detecting displacement in X axis direction, for detecting displacement in Y axis direction, and for detecting displacement in O direction, respectively, relative to the operating means 6. In each of the bridge circuits, R, R are specific resistances which form two sides of the bridge circuit. Another side provided by the strain gauges $G_A$, $G_C$ and $G_E$ in the respective bridge circuits, and the strain gauges $G_B$, $G_D$ and $G_B'$ are each formed to be further another side in respective bridge circuit. $E_{ox}$, $E_{oy}$, and $E_o$ are output terminals for respective bridge circuits *7a*, *7b*, and *7c*, these terminals being connected with the amplifier 8 as shown in FIG. 3.

The operation of the positioning device according to the present invention will now be described with reference to FIGS. 3 to 6.

Known means for printing a mask pattern as shown in FIG. 1 are arranged at the upper part of the table 1 which forms support means for a wafer 2, and a known alignment scope is arranged to view the result of the positioning operation by the device of the present invention.

An operator manipulates the grip 20 as operating means while viewing the alignment scope. At this time, a pattern on the wafer 2 and a mask pattern are viewed through the view field of the alignment scope. Since the pattern images are in slidable overlap, the operator by moving the grip 20 may displace the table 1 until both pattern images are in registry. The follow-up control by which this is done will now be described.

When the grip 20 is moved in the (+) X direction, the sliding member 17 in the recess 21 at the lower part of the grip is not affected by the applied force, while the sliding member 17 in the recess 22 is displaced, bending in the (+) X direction the flat springs 12 and 14 resting on the side wall of said recess. By flexion of the flat springs 12 and 14, the strain gauges $G_A$ and $G_B$ attached thereto receive strain of compression and tension. In the case of movement in (−) X direction these strain gauges receive strain reverse to that just described. The resistance value of the strain gauge under deformation varies, in the case of the displacement in (+), (−) X directions, by the same amount for equal displacement. If ΔR is the variation of the resistance value of the strain gauge and suffixes A to E are used to represent the resistance value of each strain gauge, the variation of the resistance value of the strain gauges $G_A$ and $G_B$ in the case of said displacement in X direction is expressed by $$\Delta R_A = -\Delta R_B$$

Hence the absolute values are equal.

Similarly for displacement of the grip 20 in Y direction, detection may is effected by strain gauges $G_C$ and $G_D$. The variation of the resistance there is $\Delta R_C = -\Delta R_D$. When the grip 20 is rotated, the flat springs 12 and 14 receive twisting action so that the strain gauges $G_E$ and $G_B$, receive strain, and the strain gauges $G_E$ and $G_B$, receive tension and compression, respectively, or strain reverse thereto, then $\Delta R_E = \Delta R_B'$ Accordingly, to detect the movement of grip 20, detection may be made by resolving it into the components of the displacement in X, Y and O directions. To take out a component in each direction as an electric signal, the variation of outputs in the bridge circuits 7a, 7b, and 7c shown in FIG. 6 is detected. At this time, the ratio ε of output voltage $E_o$ with respect to the voltage Ei applied to the bridge circuit is $$\epsilon = \frac{E_o}{Ei} = \frac{-1}{2}\,\frac{\Delta R}{R}$$

where R is the specific resistance, which is also the resistance when the strain of each strain gauge is zero. When the grip 20 combines linear movements in the X or Y direction, or both with rotating movement, the outputs from output terminals $E_{ox}$, $E_{oy}$ and $E_{o\theta}$ θ for the respective bridge circuits 7a, 7b and 7c are represented by $$Ex = \frac{\Delta Rx}{2(R_{,}\pm\Delta R\theta)},\quad Ey = -\frac{\Delta Ry}{2(R\pm\Delta R\theta)},\quad E = -\frac{\Delta R\theta}{2(R\pm\Delta Rx)}$$

The output in X or Y direction is slightly affected by the rotating component, and the output in O direction (rotating direction) is similarly affected by the X component. This influence of the X component in movement in O direction is caused by arrangement of strain gauges $G_E$, $G_B'$ (or $G_B$) in the X axis direction.

Information corresponding to the movement of the grip, which has been electrically converted in proportion to the amount of strain by the strain gauges is further converted into a voltage signal through the bridge circuit 7 and appears at the respective output terminals $E_{ox}$, $E_{oy}$, and $E_o$ , and supplies through the amplifier 8 input signals for the servo-motors 9, 10 and 11. The rate of revolution of the servo-motor is in proportion to the input voltage thereto. In the foregoing, the follow-up control has briefly been described, and now, the follow-up control with respect to the table 1, for the case in which the grip 20 was linearly moved by γ amount and rotated by α from the *x* axis, as shown in the drawing, will be described in detail.

The free ends of the flat springs 12 and 14 which detect the amount of variation of the component in the X direction of the grip, are pressed in the X direction with the movement of the grip, by the component of displacement in the X direction, that is $\delta x = \gamma \cos \alpha$. On the one hand, since the sliding member 17 is slid freely in the recess 22 in Y direction, the displacement by the component in the Y direction, that is $\delta y - \gamma \sin \alpha$, does not act on the flat springs 12 and 14 for detecting the displacement of *x* component. Accordingly, strain gauges $G_A$, $G_B$ detect the flexion δx at the free ends of the flat springs 12 and 14 as strain εx, which is converted into an electrical signal of the variation of resistance ΔRx, this signal being converted into the voltage signal Ex in the bridge circuit 7a to serve as an output and serving then as an input voltage for the servo-motor 9 through the amplification circuit 8, the base 50 with the table 1 placed thereon is moved by means of said motor in X direction.

The amount of the displacement of the component in the Y direction of the grip is detected as flexion of flat springs 13 and 15, that is, $\delta y = \gamma \sin \alpha$, in the same manner as above, which is converted into the flexion *y* of the strain gauges $G_C$, $G_D$, and further converted into the voltage signal Ey as an output through the bridge circuit 7b, and supplied through the amplifier 8 to the servo-motor 10, the base 51 with the table 1 placed thereon being moved in the Y direction.

Accordingly, if the linear proportional relation is maintained in a signal treatment of the process until the displacement $\gamma$ of the grip 20 is resolved into components $\gamma \cos \alpha$, and $\gamma \sin \alpha$ in the X and Y directions, and an electric signal in proportion thereto is converted through the bridge circuit 7 and the amplification circuit 8 into the input voltages $E_x$ and $E_y$, the speed of movement C of the table 1 is in proportion to the amount of displacement $\gamma$ of the grip 20. That is, if $C_x$ is the component of the speed in the X direction and $C_y$ is the component of the speed in the Y direction with respect to the table 1, then, $$\frac{C_y}{C_x} = \frac{\gamma \sin \alpha}{\gamma \cos \alpha} = \tan \alpha$$

and the moving directions of the grip and the table coincide. Hence, the table 1 is caused to follow the operation of the grip 20, and the position of a printed image on the surface of the wafer can be registered with the position of a mask pattern image for subsequent printing.

The relation between the amount of displacement $\gamma$ of the grip 20 and the moving speed C of the table 1 may also be expressed by a functional relation, for example, $C - K\gamma^2$ (K is a constant). Therefore, if the table 1 is desired to be greatly moved, $\gamma$ is made to be great, that is, C is made quicker, and when a fine adjustment is made, $\gamma$ is made small, that is, C is made slow. The force to operate the grip 20 is in proportion to $\gamma$ in any direction, this force being exerted outwards from a central point point O against the spring action to return to center.

In the event that the wafer 2 is desired to be rotated, the table 1 is rotated on a point P, where $x$ axis and $y$ axis intersect. To this end, the grip 20 is rotated on the point O. This amount of rotation of the grip 20 is converted into the deflection of the flat springs 12 and 14, converted into the variation of resistance value by strain gauge $G_E$, $G_B'$, $(G_B)$, and further converted into the output as a voltage signal through the bridge circuit 7*c*. According to the amount of this signal, and its positive or negative sign, the servo-motor 11 causes the table 1 to rotate in the same direction as that of grip 20. At this time, an electrical treatment may be made so that the angle of rotation $\theta$ of the grip is made in proportion to the rotational angular velocity $\omega$ of the table. Further, an electrical treatment may also be made so that the relation between $\theta$ and $\omega$ will be some desired functional relation.

When the operating force on the grip 20, described above is released, the grip 20 is automatically returned by the restoring force of the flat springs 12 to 15 to its original position, viz. $X = Y = 0, \theta = 0$. For this purpose a restoring spring or other restoring mechanism may specifically be provided in addition.

The aforesaid servo-motors 9, 10, and 11 which constitute driving means adapated to move the table 1 in X, Y, and O directions remain, as does the table, in the position of displacement to maintain registration between the wafer 2 and the mask 3 after the alignment operation has been completed and the grip 20 has been returned to its original position. However, in order to return the wafer to its original position after the mask pattern has been printed on the wafer, a potentiometer is added to each of said servo-motors to store the accummulated revolution of the servo-motors, and the servo-motors can be returned to their original positions, recognizable by reference to the potentiometers, by a reset signal from reset means not shown.

According to embodiments shown, two temperature self-compensated type strain gauges are used in each direction to form a bridge circuit, but if four strain gauges are used to form a bridge circuit, a double voltage signal can be obtained. In case a spherical sliding cap 17 is mounted on the flat springs 12 to 15 or a cylindrical sliding top as shown, it is desirable keep the fit of the cap in the recesses 21 and 22 in the X and Y directions rather loose, so as not to apply a twisting force on the flat springs.

Further, the semi-conductor strain gauges used in this invention should desirably have a rate of resistance variation greater than that of other strain gauges and have a high fatigue limit.

Figure 7:
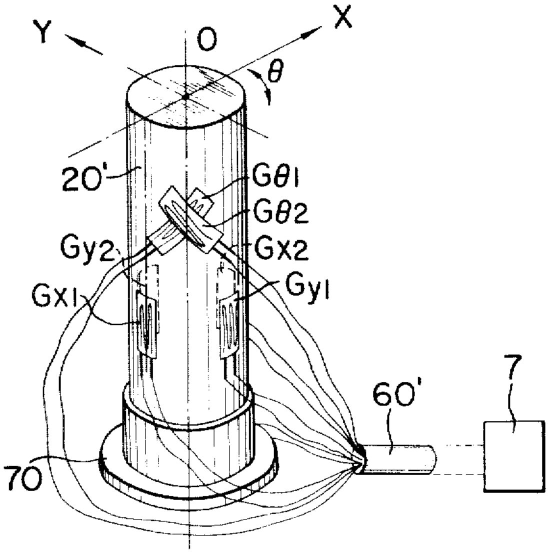
FIG. 7 is a perspective view showing a modified form of operating means and control signal producing means as shown in FIG. 4.

FIG. 7 shows a modification of a manually controlled operating means which employs such a strain gauge.

The numeral 20' designates an operating portion corresponding to the grip 20 of FIG. 4, of cylindrical shape and mounted on the base 70 in a manner of displaceable in X, Y, and O directions. On the surface of this operating portion, there is attached a pair of strain gauges $Gx_1$ and $Gx_2$ on the line which intersects with X axis to detect the displacement in the X direction of the operating portion, there is attached a pair of strain gauges $Gy_1$ and $Gy_2$ on the line which intersects with Y axis to detect the displacement in the Y direction, and there is attached a pair of strain gauges $Go_1$ and $Go_2$ arranged to meet at right angles to detect the displacement in the O direction. An output line 60' for those strain gauges as described above is connected with the aforesaid bridge circuit 7, and other signal outputs are exactly the same as that of operating means as previously described. Strain gauges $Gx_1$, $Gx_2$, $Gy_1$, $Gy_2$, and $Go_1$, $Go_2$ are each connected with respective side in exactly the same manner as that of the foregoing strain gauges $G_A$ to $G_E$. Accordingly, the mode of control through which the table 1 is driven by operation of the operating portion 20' is exactly the same as that already described and need not be described further here.

Figure 8:
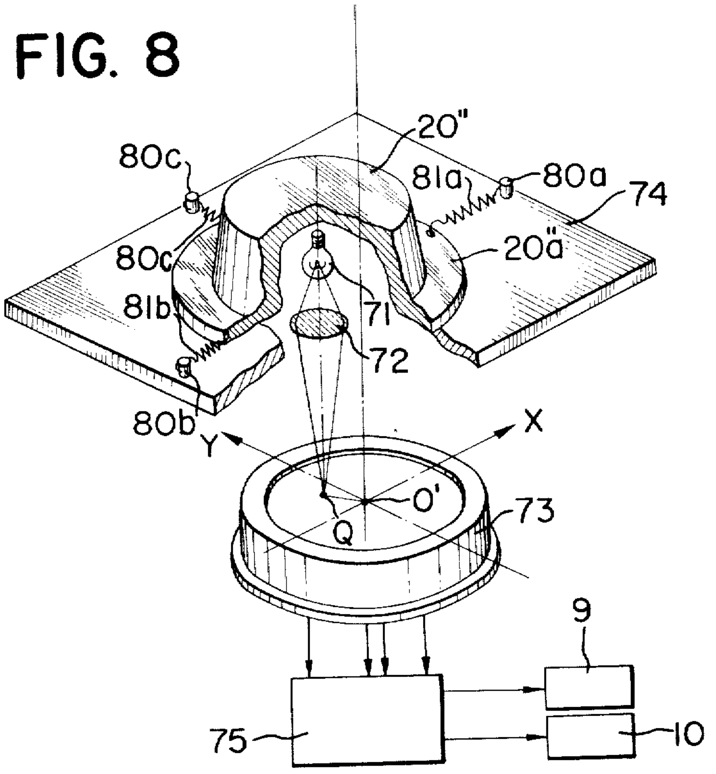
FIG. 8 is a perspective view showing a modified form of the operating means and control signal producing means as shown in FIG. 4 and FIG. 7.

FIG. 8 shows operating means of the present invention and another modified form of control signal producing means. The numeral 20'' denotes a grip 20'' corresponding to the grip 20 and its flange portion 20''a slides on the fixing base 74. The numeral 71 is a light source which is secured to said grip 20'' and which is movable along with the grip. The numeral 72 is a lens which is secured to the grip and which projects so that light from said light source 71 to form an image on the light receiving surface of a photoelectric transducer element 73. This element 73 preferably comprises a photoelectromotive force element which converts light into the electric signal, preferably electromotive force, which detects the displacement from the original point of the grip 20'' dividing it into X component and Y component. By this reason, a center O' of the light receiving surface of the photoelectric transducer element 73 is arranged in registration with the center of the grip 20''. As shown in the drawing, therefore, the displacement of the grip 20'' causes the displacement of the light source 71 and the movement of its image from the point O′ to the point Q on the light receiving surface and the displacement components in the X direction and in the Y direction, respectively, are each converted into an electric signal, amplified by means of control means 75, and fed to the servo-motors 9 and 10 in the form of a voltage signal. Thereby, the table 1 can be driven in X and Y directions (see FIG. 3). In operation that does not require rotation, the table 1 can be driven by means of operating means 20″ and control signal producing means 73 as shown in FIG. 8, thus simplifying the construction of the positioning device.

In order to automatically return the operating grip 20″ as shown in FIG. 8 to its original point when its operating force is released, there are provided resilient means 81*a*, 81*b*, 81*c* and 81*d* (not shown), one end of which is secured to the grip 20″, and other end of which is secured to stopping members 80*a*, 80*b*, 80*c*, and 80*d* (not shown) of the fixing base 74.

According to this invention, the displaced position of the operating grip moved from the original point is resolved into X, Y, and $\theta$ components to make a set of electric signals, by which the wafer loaded table is driven, so that the table may be moved in a desired direction only by operation of the grip and the alignment operation is carried out in an extremely simple operation. Further, it is necessary only to provide electrical circuits to link the position of the grip to the movement of the table, and the electrical circuits can easily allow the grip and the table to be separately provided in respective suitable locations. Accordingly, remote control is possible by addition of a TV monitor looking into the alignment scope.

We claim:

1. A positioning device for setting an article in a predetermined position comprising:

means for supporting said article;

driving means associated with said support means for moving said support means in a suitable direction for placing said article in the predetermined position;

means for manual operation located away from said supporting means and associated with said driving means only by electric circuits, said manual operation means being linearly and rotationally displaceable from a reference position;

means for restoring said manual operation means to said reference position when unoperated manually;

means for detecting the displacement of said manual operation means from the reference position, and for resolving the detected displacement into at least two directional components and producing control signals representing the magnitude of said components and the direction from the reference position;

control means connected with said driving means for supplying said control signals to said driving means in accordance with the kind of the control signals so as to move said supporting means carrying the article at a speed that varies in the same sense as the magnitude of said components in the directions designated by said control signals.

2. A device according to claim 1, wherein said detecting means includes means adapted to detect the displacement of said manual operating means as strain and to produce an electric signal corresponding to said strain.

3. A device according to claim 2, wherein said detecting means further includes strain gauges.

4. A device according to claim 1, wherein said detecting means includes means adapted to detect the displacement of said manual operating means and to produce an electromotive force corresponding to the amount of displacement.

5. A device according to claim 1, wherein said control means includes bridge circuits to which said control signals representing component magnitude are applied in directional pairs.

6. A device according to claim 1, wherein said driving means includes at least two servo-motors operatively connected with said article support means and arranged to move said support means respectively in two directions mutually at right angles.

7. A positioning device according to claim 1 in which said detecting means is constituted for resolving the detected displacement into two linear directional components and one rotational directional component.

8. A positioning device according to claim 1 in which said manually operable means includes a base member, a manually movable body movable relative to said base member in translation and rotation and means for restoring said manually movable body to a reference position relative to said base member when no force is manually applied to said body, and in which said detection means includes a plurality of deflectable members arranged to deflect in response to a component of the displacement of said manually movable body relative to said base member and also means for converting the deflection of said deflectable members respectively into electric signals and in which, further, said control means includes a plurality of bridge circuits to which signals produced by said converting means are connected pairwise to produce signals corresponding to direction and magnitude of the respective components of said displacement for supply to said driving means.

9. A positioning device for aligning an optically projected mask pattern with marks on an article, comprising:

optical means for observing error in said alignment;

support means for said article;

means for moving said support means in a predetermined plane along first and second mutually transverse axes of translation and in rotation about an axis perpendicular to said plane, said support moving means including electric motor drive means for each translational axis and for said rotational axis;

manual operating means including a base and a control body at least part of which is displaceable relative to said base in translation in any direction in a second predetermined plane and in rotation about an axis perpendicular to said second predetermined plane;

restoring means for bringing said control body to a reference position relative to said base when no force is manually applied thereto, said reference position corresponding to a reference position of said support means in which the centers of said support means and of the projected mask pattern are substantially congruent and the orientations of said support means and said mask pattern are substantially in a predetermined relation;

means for detecting displacement of said control body from the reference position thereof as resolved into components with reference to a first and a second of two mutually transverse axes of translation and an axis of rotation and converting the magnitude of detected resolved displacement into electric control signals; and electric circuit means for deriving, from said electric control signals, drive power for said respective electric motor drive means in such a way that displacement of said control body with reference to its first or second translational axis of displacement or its axis of rotation, as the case may be, produces a corresponding magnitude and direction of motion of said article support means along its first or second axis of translation or about its axis of rotation respectively, whereby said support means is automatically placed in its reference position prior to the manual application of force to said control body to initiate and perform an alignment operation, thereby to minimize movement of the support means in a series of alignment operations.

10. A positioning device for aligning an optically projected mask pattern with marks on an article, comprising:

optical means for observing error in said alignment;

support means for said article;

means for moving said support means in a predetermined plane along first and second mutually perpendicular axes of translation and in rotation about an axis perpendicular to said plane, said support moving means including individual electric motor drive means for each translational axis and for said rotational axis;

manual operating means including a base and a control body displaceable relative to said base in a plane defined by the construction of said manual operating means, being displaceable both in translation in any direction and in rotation;

a plurality of deflectable members arranged and disposed to be deflected by components of displacement of said control body relative to said base of said manual operating means, being arranged in pairs for response respectively to components of said displacement with reference to a first and second mutually perpendicular axes of translation of an axis of rotation, said deflectable members being disposed in a circle spaced substantially 90° apart and arranged to deflect by movement imparted in a direction tangential to such circle at the location of the particular deflectable member;

converting means associated with said deflectable members for producing electrical signals of a magnitude at least approximately in proportion to the deflection of said deflectable members; and electric circuit means including three bridge circuits to which the signals of said converting means are connected pairwise to produce control signals derived from components of displacement of said control body with reference to its first and second translational axes and its axis of rotation respectively and for supplying said electric control signals to the respective electric motor drive means of said support moving means relating to the respective translational axes and rotational axis thereof, said bridge circuits being so constituted that deflections in the same direction of a diametral pair of deflectable members are detected to produce a translational displacement signal and deflections in opposite directions of a diametral pair are additively detected to produce a rotational displacement signal.

11. A positioning device as defined in claim 10, in which said converting means are semiconductor strain gauges.

12. A positioning device as defined in claim 10, in which said device also comprises a light source and means for projecting an illuminated mask pattern on said article.

* * * * *